United States Patent [19]
Nelson et al.

[11] Patent Number: 5,347,816
[45] Date of Patent: Sep. 20, 1994

[54] VARIABLE PRESSURE THERMAL INSULATING JACKET

[75] Inventors: Paul A. Nelson, Wheaton; Richard F. Malecha, Naperville; Albert A. Chilenskas, Chicago, all of Ill.

[73] Assignee: University of Chicago, Chicago, Ill.

[21] Appl. No.: 923,375

[22] Filed: Jul. 31, 1992

[51] Int. Cl.⁵ ............................................. F17C 11/00
[52] U.S. Cl. ....................................... 62/46.2; 429/120
[58] Field of Search ................ 62/46.3, 46.2; 429/120

[56] References Cited

U.S. PATENT DOCUMENTS

| | | | |
|---|---|---|---|
| 3,732,690 | 5/1973 | Meijer | 123/1 A |
| 3,745,048 | 7/1973 | Dinkler et al. | |
| 3,756,040 | 9/1973 | Westling | 62/46.3 |
| 3,967,465 | 7/1976 | Asselman et al. | 62/46.3 |
| 4,007,315 | 2/1977 | Brinkmann et al. | |
| 4,259,846 | 4/1981 | Rudolphi et al. | 62/46.3 |
| 4,566,281 | 1/1986 | Sandrock et al. | 62/46.2 |
| 4,649,091 | 3/1987 | McElroy | |
| 4,678,724 | 7/1987 | McElroy | |
| 4,935,318 | 6/1990 | Ikoma et al. | |
| 4,994,334 | 2/1991 | Ikoma et al. | |
| 4,996,108 | 2/1991 | Divigalpitiya et al. | |
| 5,034,289 | 7/1991 | Yuasa et al. | |
| 5,035,964 | 7/1991 | Levinson et al. | |
| 5,082,753 | 1/1992 | Shimizu et al. | |

FOREIGN PATENT DOCUMENTS

| | | |
|---|---|---|
| 3022859 | 12/1981 | Fed. Rep. of Germany . |
| 114802 | 9/1981 | Japan . |

Primary Examiner—Ronald C. Capassela
Attorney, Agent, or Firm—Reinhart, Boerner, Van Deuren, Norris & Rieselbach

[57] ABSTRACT

A device for controlled insulation of a thermal device. The device includes a thermal jacket with a closed volume able to be evacuated to form an insulating jacket around the thermal source. A getter material is in communcation with the closed volume of the thermal jacket. The getter material can absorb and desorb a control gas to control gas pressure in the volume of the thermal jacket to control thermal conductivity in the thermal jacket.

20 Claims, 4 Drawing Sheets

VARIABLE PRESSURE THERMAL INSULATING JACKET

The invention was made with Government support under Contract No. W3 1-109-ENG-38 awarded by the Department of Energy. The Government has certain rights in this invention.

The present invention is concerned generally with a device for controlling the temperature of an environment. More particularly, the invention is concerned with a variable pressure thermal insulating jacket for control of temperature of the insulated object. Such a device can be used, for example, to control the temperature of high temperature batteries. In another aspect of the invention a chemical getter is used to controllably absorb and release hydrogen in a thermal barrier jacket to modify the thermal conductivity of the jacket to control cooling of the heat source.

Control of thermal barriers is an important aspect of numerous technologies, including the control of the operating temperature of batteries for electric vehicles. Thermal jackets around such thermal sources as batteries require cooling to prevent overheating of the batteries during prolonged use and vigorous discharge. In order to limit battery volume the battery insulation is usually maintained at a vacuum of 1-10 Pa or less. This makes possible the use of thermal jackets which are only 1.5-3 cm thick and have heat loss rates of less than 200 W for a 40 kWh battery. In previous designs, one technique used to control temperature was to provide liquid coolant tubes for cooling the batteries. Such systems required additional structure and expense to install and maintain. Such high temperature batteries include, for example, lithium/sulfide (425° C. operating temperature), sodium/sulfur (325° C.) and sodium/nickel chloride (300° C.) which require high efficiency insulating jackets to maintain the temperature within an acceptable range (typically within 25°-50° C. of the designated operating temperature). Overheating can be most severe during periods of vigorous discharge and during charging for batteries that have high entropic cooling during discharge, such as lithium/disulfide batteries.

Much effort has been spent on developing vacuum insulation for high-temperature batteries involving the use of ceramic powders, rigid porous ceramic boards, and multifoil insulation. The factors that must be controlled for an efficient insulation are heat transfer by radiation, conduction through the solid structure, and conduction through residual gases. The lowest rates of conduction through the insulation have been achieved with the use of loosely wrapped multifoil insulation, which consists of thin aluminum foils separated by glass paper. For this type of insulation, the casing walls must be strong enough to support the atmospheric pressure. Thus, only cylindrical shapes appear to be practical. Ceramic structures that are strong enough to support the casing walls against atmospheric pressure transfer more heat than is desired by direct conduction through the ceramic material and/or by radiation and reflection through the pores.

Others have attempted to make a satisfactory load-bearing insulation by compressing multifoil structures at elevated temperatures, which caused partial sintering of the glass paper used to separate the aluminum foils. The resulting material was sufficiently strong, but its conductivity was too high. Whereas unsintered compressed multifoil structure had about twice the conductivity of loosely packed multifoil of the same thickness, sintered structures had conductivities that were eight to ten times higher. The higher conductivity of the compressed structure resulted from increased conduction through the glass fibers because of their greater density and increased contact area, which were even further enhanced by sintering. Moderately low conductivity for unsintered compressed multifoil layers was utilized in a different design approach wherein an insulating jacket was made by tightly wrapping layers of aluminum foil and glass paper around the inner stainless steel casing of the insulating jacket and then welding the outer casing in place over the insulation. This type of vacuum insulation has the advantages of (1) moderately low conductivity, (2) being adaptable to large flat surfaces in that it supports the stainless steel inner and outer casings against atmospheric pressure, and (3) conforming to curved surfaces not easily fired with flat board-like insulations. However, the compressed multifoil insulation also has disadvantages. It is difficult to degas because of the large area of tightly packed sheet material, and it is moderately dense (0.57 g/cm$^3$), which results in a heavy jacket.

It is therefore an object of the invention to provide an improved device and method for controlling thermal conductivity of a thermal barrier.

It is another object of the invention to provide a new method and device for controlling the cooling of high temperature batteries.

It is a further object of the invention to provide an improved chemical control device for modifying the thermal conductivity of a thermal barrier.

It is yet an additional object of the invention to provide a novel gettering device for changing absorption and desorption of gas in a thermal jacket for thermal control purposes.

It is still another object of the invention to provide an improved high temperature battery system having a device for precise control of battery operating temperature.

Other objects and advantages of the invention will be apparent from the detailed description provided hereinafter and the drawings described hereinbelow, wherein like elements have like numerals throughout the several drawings.

DETAILED DESCRIPTION OF PREFERRED EMBODIMENTS

Figure 8:
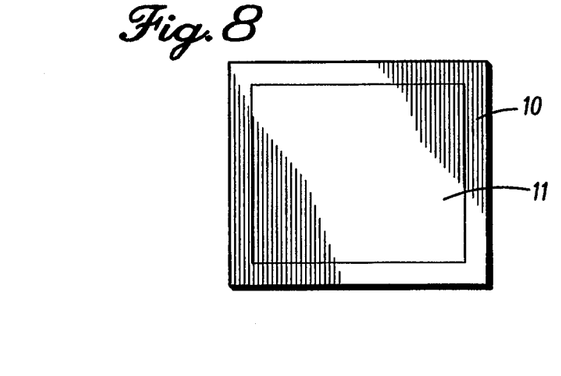
FIG. 8 shows a functional block diagram of a thermal jacket constructed in accordance with the invention surrounding a thermal source.

In a preferred form of the invention shown in FIG. 8 the gas pressure in a thermal jacket 10 of a thermal source 11 (for example, high temperature fuel cells, mechanical, chemical, or electrochemical processes and the like, including, but not limited to, endothermic or exothermic chemical reactions, and other sources of thermal energy) is controlled to range over a broad range of pressure. In the most preferred form of the invention shown in FIG. 5 the gas pressure in a thermal jacket 10 of a bipolar battery 12 is controlled to range over a pressure of 1-1000 Pa ($10^{-2}$ to 10 torr). The thermal jacket 10 comprises loosely wrapped multifoil insulation. Gas pressure control is exerted for the pressure within the spaces between the foil layers and thus allows control of the rate of heat loss from the jacket 10. In particular, at the low pressure end of the range, the mean free path of the gas molecules greatly exceeds the size of the interstices in the insulation, thus resulting in low conductivity through the gas. The variation in pressure in the jacket 10 can be achieved by the admission of air to raise the heat loss rate, and the use of a small mechanical vacuum pump to lower the cooling rate.

A particularly effective, and most preferred, method of varying the pressure is accomplished by changing the temperature of a conventional getter material which reversibly absorbs and desorbs hydrogen (or other gas) in the gas space. A getter such as Zr-70%, V-24.6%, Fe-5.4% (St 707 alloy supplied by SALES Getters-/U.S.A., Inc.), is normally used to remove gases in vacuum systems and is effective for control of nitrogen, oxygen, and hydrogen gases, the preferred gaseous constituents in the thermal jacket 10. Alloys of the same type, but at different constituent concentrations, or other conventional gettering alloys will irreversibly getter nitrogen and/or oxygen but permit variation in the hydrogen pressure over the desired range by varying the getter temperature. As an example, getter alloy St 737 (SAES Getters/U.S.A., Inc.), which has the composition Zr, V-33%, Fe-33%, will store hydrogen at 2500 Pa-L/g (20 torr-L/g) without alloy embrittlement. At this concentration, the equilibrium pressures are about 1.0 Pa at 50° C. and 1000 Pa at 250° C. Therefore a getter 30 (see FIG. 5A and B) with a controlled resistance heater 32, can be used to vary the hydrogen pressure within the thermal jacket 10 and, thus, the rate of heat loss. Either method of pressure control, the use of a mechanical vacuum pump or the variation in the getter temperature, is effective in controlling the rate of battery cooling, and both methods have common advantages and special requirements compared to more conventional means of cooling. It should also be noted that the use of air and a mechanical vacuum pump requires valves, but the use of hydrogen gas and a getter does not.

In other forms of the invention, other getter materials can be used to preferentially absorb or desorb gases, such as oxygen, nitrogen, carbon dioxide, sulfur oxide and the like. Examples of other getter alloys are included in Table 1.

Pressure variation for heat loss control requires a loose insulation, or at least an insulation with well-distributed gas passages, to permit rapid flow of gas to the vacuum pump or getter. For the preferred degree of temperature control one changes the pressure within the desired range by at least two orders of magnitude within about 30 minutes. The most direct approach to meeting this condition is to design the jacket 10 with internal and external metal casings that can withstand a full vacuum without support by the insulation. Where the jacket weight is important, a cylindrical shape is preferred. In tests of jackets with flat sides, for which the metal casings were supported by compressed multifoil insulation, it required long periods (several days) for the initial evacuation because of the restricted gas flow passages. The use of pressure variation in the jacket 10 for cooling rate control is undesirable for such batteries.

TABLE 1

| Examples of Gas Getter Materials | |
|---|---|
| Material | Gas |
| Zr—Al | Hydrogen |
| Zr—Ni | Hydrogen |
| Zr—Ti—Ni | Hydrogen |
| Zr—V$_2$ | Hydrogen |
| Zr—V$_{2-x}$ | Hydrogen |
| —Fe$_x$ | Hydrogen |
| Zr—V$_{2-x}$ | Hydrogen |
| —Cr$_x$ | Hydrogen |
| La—Ni | Hydrogen |
| Ca—Ni | Hydrogen |
| Ba—Al | Hydrogen |
| Fe$_4$N | Nitrogen |
| Ge$_3$N$_4$ | Nitrogen |

The use of cylindrical insulating jackets, which is a most preferred form for the inventive cooling method, is also most preferred for bipolar batteries having round cells approximately 10 to 18 cm in diameter. This is a useful design for achieving high specific energy with high-temperature batteries. Lithium/sulfide and sodium/nickel chloride batteries, which can be fabricated with long strings of series-connected cells because a short circuit is formed on cell failure, are especially favorable for the bipolar design shown in FIG. 5.

Figure 2:
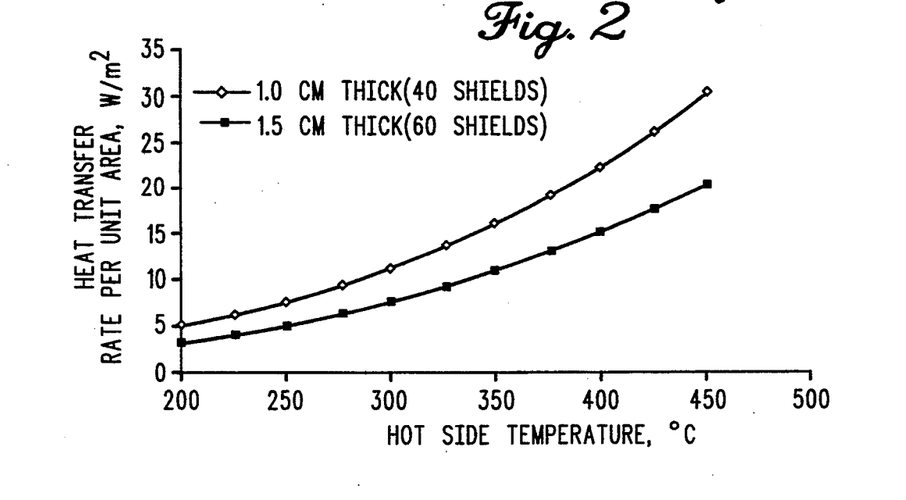
FIG. 2 shows heat transfer rates through evacuated multifoil insulation having forty shields and sixty shields per centimeter of thickness and a cold side temperature of 25° C.

To further assess the capabilities of the invention, conventional and accepted heat transfer calculations were made for the loosely stacked multifoil insulation comprising the jacket 10. To simplify the calculations the effects of glass paper separating the aluminum foil shields on the heat transfer rate were ignored. Glass paper reflects radiated heat but as an offset to this effect, it also transmits heat by conduction in regions where it touches the foil. With the very thin, low density, lightly compressed paper under consideration, these effects are believed to be minor. With this assumption, the heat transfer rate between heat shields was calculated by the equation:

$$q = A\sigma \frac{\epsilon}{2 - \epsilon} T_1^4 - T_2^4 \qquad (1)$$

where
q = heat transfer rate, W
A = area, m$^2$
$\sigma$ = Stefen-Boltzmann constant, $5.67 \times 10^{-8}$ W/m$^2$K$^4$
$\epsilon$ = emissivity of aluminum foil
T$_1$ = temperature of the hotter shield, K
T$_2$ = temperature of the cooler shield, K The emissivity of the aluminum foil was taken to be 0.15 throughout the temperature range of interest. With a given value of the hot-side temperature and an assumed value for the heat transfer rate per unit area (q/A), the temperatures of the heat shields were calculated by means of Equation (1). This procedure was repeated in an iterative process with adjusted values of q/A until the temperature on the fortieth heat shield of the jacket 10 (1-cm thick insulation) was 25° C., the given cold-side temperature. The results of this calculation for hot-side temperatures between 200° C. and 450° C. are shown in FIG. 2. The results for sixty heat shields for the jacket 10 (1.5-cm thick insulation having forty shields/cm) are also shown.

In a previously described example a packing density of forty shields/cm used in our calculations, was found to give near the minimum conductance for a given thickness of alternating layers of aluminum foil of 7.6-μm (0.3 mils) thickness and Grade 233 Dexter paper of 80-μm (3.2 mils) thickness. Measurements in that study provided heat transfer rates on similar materials that were 28% lower than those shown in FIG. 2, likely due to the assumption that the effect of the glass paper on the heat transfer rate was negligible. Also, a lower value for the emissivity of 0.11, instead of the value actually used 0.15, would bring the calculated values very close to the measured value. The calculated values were then considered sufficiently accurate without adjustment.

The effects of adding air or hydrogen to the insulation were also considered. To account for the gas conductivity, an additional term was added to Equation (1):

$$q = A\sigma \frac{\epsilon}{2 - \epsilon} T_1^4 - T_2^4 + A\frac{k}{d}(T_1 - T_2) \quad (2)$$

where
k=gas conductivity, W/m-k
d=distance between aluminum heat shields, m

Figure 3:
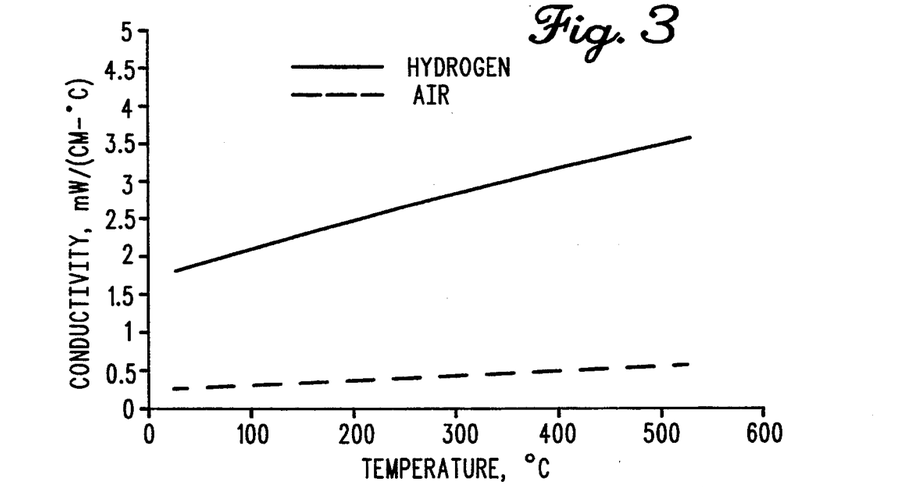
FIG. 3 illustrates conductivity of air and hydrogen as a function of temperature.

Known values of the thermal conductivity of air and hydrogen over the temperature range of 27° C. to 527° C. (300 to 800K) were curve fitted. The curves are shown in FIG. 3 and were used in solving Equation (2).

Figure 1A:
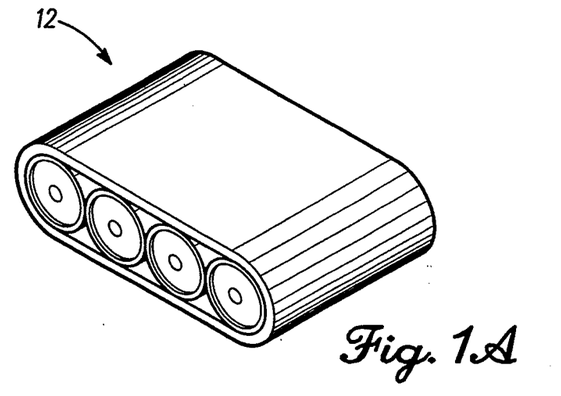
FIG. 1A illustrates an example of a tightly wrapped insulation for a high temperature bipolar battery and FIG. 1B shows an example of loosely wrapped insulation.
Figure 1B:
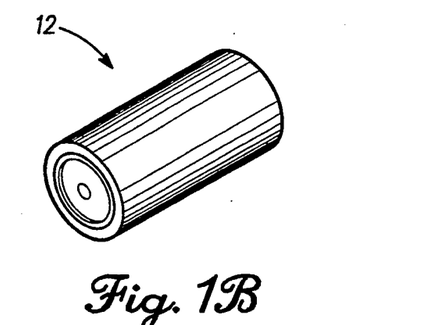
Figure 4:
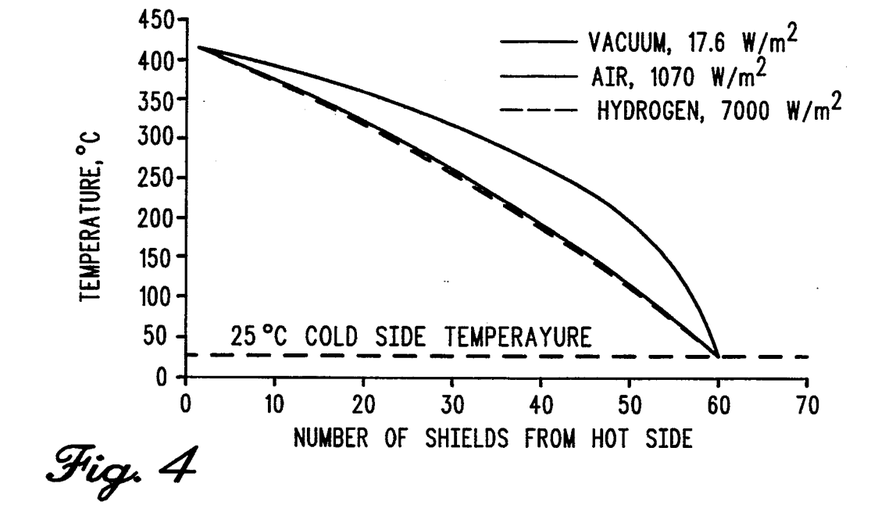
FIG. 4 shows temperature distribution within multifoil heat shields for a hot side temperature of 425° C. with evacuated insulations and insulations containing hydrogen and air.

In calculations carded out in a manner similar to those used for evacuated insulation, the temperature distribution within the insulation was calculated for air-filled and hydrogen-filled insulation. With a given value of the hot-side temperature of 425° C. and an assumed value for the heat transfer rate per unit area (q/A), the temperatures of the heat shields were calculated by means of Equation (2), with the thermal conductivities adjusted for the temperatures of the individual heat shields. This procedure was repeated in an iterative process with adjusted values of q/A until the temperature on the sixtieth heat shield for the jacket 10 was 25° C., the given cold-side temperature. The results for the temperature distribution within the insulation are presented in FIG. 4 for vacuum, hydrogen, and air atmospheres within the insulation. The calculated heat transfer rates are given in the right-hand column of Table 2 along with similar calculations for a hot-side temperature of 300° C. and 1.0-cm insulation thickness. Table 2 also provides data on the known heat transfer rate through compressed insulation under vacuum. A comparison of the calculated values in Table 2 indicates a large increase in the heat transfer rate on the admission of gas to the insulation and shows that hydrogen is more effective than air. For loosely stacked insulation for the battery 12, the gas pressure should preferably be at least 1000 Pa (10 mbar) for the full conductivity of the gas to take effect. Below that level, the conductivity of the gas is reduced by the effect of the long mean free path of the molecules relative to the size of the interstices within the insulation. Below 1 Pa, the heat transfer rate is independent of pressure, being essentially that for a full vacuum. In the intermediate pressure region (1 to 1000 Pa), the curve of heat transfer rate versus pressure is "S" shaped, connecting the lower plateau below 1 Pa to the upper plateau above 1000 Pa and having a pressure range in which the heat transfer rate is approximately proportional to pressure. Our calculations have shown that 10-kWh assemblies for the bipolar battery 12 for either of lithium/sulfide (including lithium/disulfide) or sodium/nickel chloride can be designed with dimensions, not including thermal insulation, of approximately 15 cm in diameter and 120 cm long. A 40-kWh battery for an electric vehicle would require four such assemblies and could be designed to deliver about 90 kW of power. The two design approaches shown in FIG. 1A and 1B were evaluated. As shown in Table 3, there is a considerable difference in the density of the insulation for these two design approaches. Mainly because of this factor, the jacket 10 for a 40-kWh battery would be only 62% as heavy for the second approach (28.2 kg versus 45.8 kg), which has loosely wrapped insulation. The heat loss rate through the insulation is essentially the same for both approaches, 44 W for the tightly wrapped insulation of the jacket 10 and 48 W (12 W×4 modules) for the loosely wrapped insulation.

The heat loss rates through power leads 16 become an important factor for the improved insulation designs discussed above. Calculations were made for heat losses through copper leads of 30 cm length, assuming no heat loss from the leads 16 to the insulation. Heat generation within the leads 16 and variation of the thermal and electrical conductivities with temperature were taken into account. By iterative calculations, the diameters of the leads 16 were sized to provide a moderate heat loss rate at the maximum current. Leads having somewhat smaller diameters would overheat because of ohmic heating. The heat losses shown in Table 3 are at standby or at low power. For both design approaches, there are two parallel strings, each providing a maximum of 180 A. For the design having all assemblies in one thermal jacket, the assembly leads are connected to single leads to positive and negative battery terminals. These leads deliver up to 360 A and lose a total of 41 W of heat by conduction to external leads at 100° C. The loosely wrapped insulation approach requires four jackets, each having two leads (positive and negative), which deliver up to 180 A and lose a total of 20.5 W of heat. Thus, the four sets of the leads 16 for the entire 40-kWh battery lose 82 W, twice as much as the leads 40-kWh hour battery in a single jacket. The total heat loss from these four sets of leads could be reduced from 82 W to about 50 or 60 W by minimizing the lengths of the leads connecting the modules in series and providing ample thermal insulation on these external leads. In Table 3 no allowance was made for this savings in heat loss for the four-module battery.

The total heat loss rates from both batteries are acceptably low. These low rates result from the very compact design of the bipolar batteries and the resulting small surface area of the thermal jacket per unit of energy stored by the battery.

TABLE 2

Heat Transfer Rates through Load-Bearing and Loosely Stacked Multifoil Insulation

| | Insulation Type | | |
|---|---|---|---|
| | Compressed at 1.0 Bar | Loosely Stacked | Loosely Stacked |
| Heat Shields per Centimeter | 159 | 40 | 40 |
| Hot-Side Temperature, °C. | 449 | 300 | 425 |
| Cold-Side Temperature, °C. | 25 | 25 | 25 |
| Insulation thickness, cm | 2.0 | 1.0 | 1.5 |
| Heat Transfer Rates, Measured at Vacuum (0.1 Pa) | 23.9 | — | |
| Calculated | | | |
| Vacuum (0.1 Pa) | — | 11.5 | 17.6 |
| Air Pressure (>1000 Pa) | — | 1000 | 1070 |
| Hydrogen Pressure (>1000 Pa) | — | 6600 | 7000 |

Aluminum foil thickness, 7.6 μm (0.3 mils); glass paper (Dexter 233) thickness, 81 μm (3.2 mils).

Table 3 also provides data on the cooling rate through the insulation. The battery with tightly wrapped insulation is designed to be cooled by air flowing through robes that penetrate the insulation and pass between the stack assemblies at the interior of the battery to provide a cooling rate of 6,000 W. For the cylindrical module with loosely wrapped insulation, a design cooling rate of 2500 W/m² was used. This rate of heat transfer for 1.5 cm insulation is considerably lower than the 7,000 W/m² value for hydrogen-filled insulation shown in FIG. 4 and Table 2. The more conservative value was used because it is clearly adequate and it can be achieved with less addition of hydrogen, perhaps to a pressure of only 100 to 500 Pa. The design goal used here of 2,500 W/m² could not be achieved with air. Hydrogen is clearly more efficient than air for assisting in battery cooling. Also, hydrogen pressure can be controlled by the getter temperature and does not require the use of valves.

TABLE 3

Comparison of Two Types of Insulating Jackets for High-Temperature Bipolar Batteries 425° C. Operating Temperature

| | Tightly Wrapped Insulation | Loosely Wrapped Insulation |
|---|---|---|
| Energy stored per module, kWh: | 40 | 10 |
| Number of stacks per assembly: | 4 | 4 |
| Number of assemblies per module: | 4 | 1 |
| Bipolar stack assembly dimensions | | |
| Diameter, cm: | 15 | 15 |
| Length, cm: | 120 | 120 |
| Jacket dimensions | | |
| Height or diameter, cm: | 19.5 | 18.5 |
| Width, cm: | 64.7 | 18.5 |
| Length, cm: | 127.2 | 125.7 |
| Jacket volume for 40-kWh battery | | |
| Actual, L: | 150 | 134 |
| Based on rectangular dimension, L: | 160 | 171 |
| Insulation density, g/cm³ | 0.57 | 0.143 |
| Insulation thickness | | |
| Side walls, cm: | 2.0 | 1.5 |
| End walls, cm: | 3.0 | 2.25 |
| Stainless steel casing thickness, cm: | 0.038 | 0.038 |
| Weight breakdown for module | | |
| Stainless steel casings, kg: | 11.8 | 4.0 |
| Insulation, kg: | 24.0 | 1.5 |
| Heating system, kg: | 6.0 | 1.0 |
| Cooling system, kg: | 4.0 | 0.5 |
| Total, kg: | 45.8 | 7.1 |
| Jacket weight for 40-kWh battery, kg: | 45.8 | 28.2 |
| Heat loss rates for module Insulation | | |
| Per Unit area, W/m² | 22.6 | 17.6 |
| Total, W: | 44 | 12 |
| Feedthroughs | | |
| Maximum current, A: | 360 | 180 |
| Power-lead diameter, cm: | 0.80 | 0.56 |
| Power-lead losses, W: | 41 | 20.5 |
| Auxiliary lead losses, W: | 4 | 2 |
| Gas cooling lines, W: | 5 | 0 |
| Total heat losses, W: | 94 | 34 |
| Heat loss rates for 40-kWh battery, W: | 94 | 138 |
| Maximum cooling rates ofor module Insulation | | |
| Per Unit area, W/m² | 22.6 | 2,500* |
| Total, W: | 44 | 1,700* |
| Cooling by air through tubes, W: | 6,000 | 0 |
| Balance of system, W: | 50 | 22.5 |
| Total cooling rates, W: | 6,100 | 1,700 |
| Maximum cooling rates for 40-kWh battery, W: | 6,100 | 6,800 |

*Hydrogen filled.

Figure 5A:
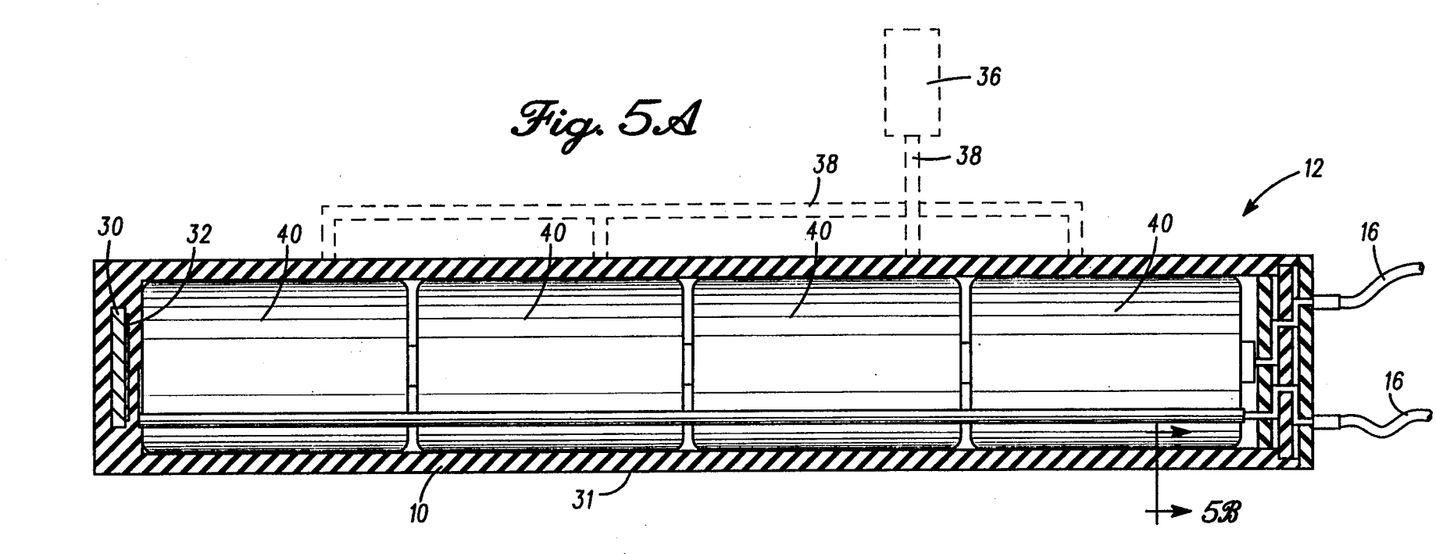
FIG. 5A illustrates a longitudinal cross section through a 10-kWh bipolar battery with loosely wrapped multifoil insulation and FIG. 5B shows a partial cross section of the thermal jacket along line 5B—5B.
Figure 5B:
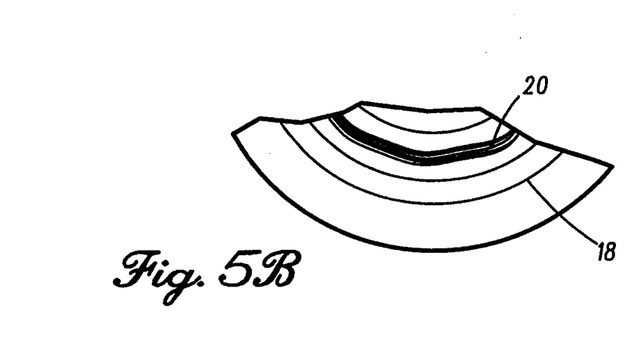
Figure 6:
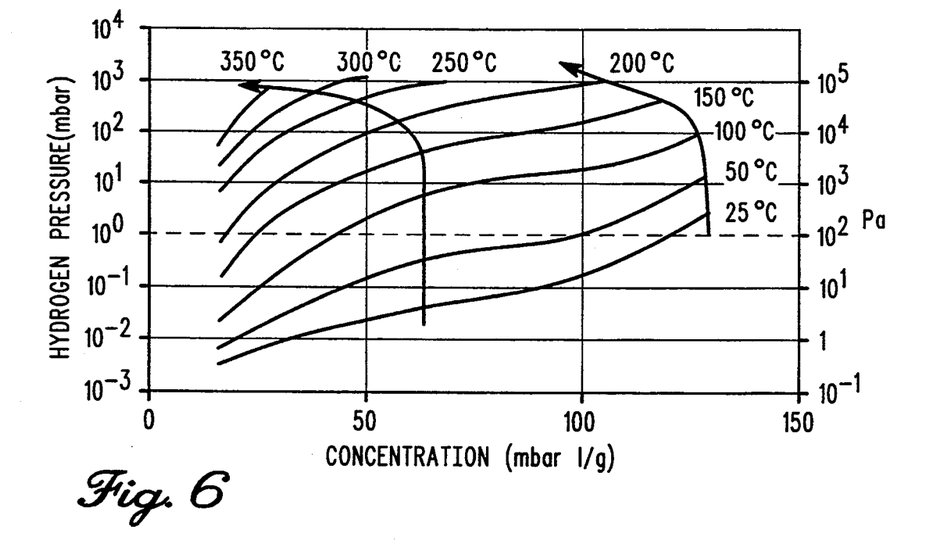
FIG. 6 shows the characteristic performance curves of a getter alloy (St 737) for various hydrogen atmosphere pressures against mbar-l/g concentration.
Figure 7:
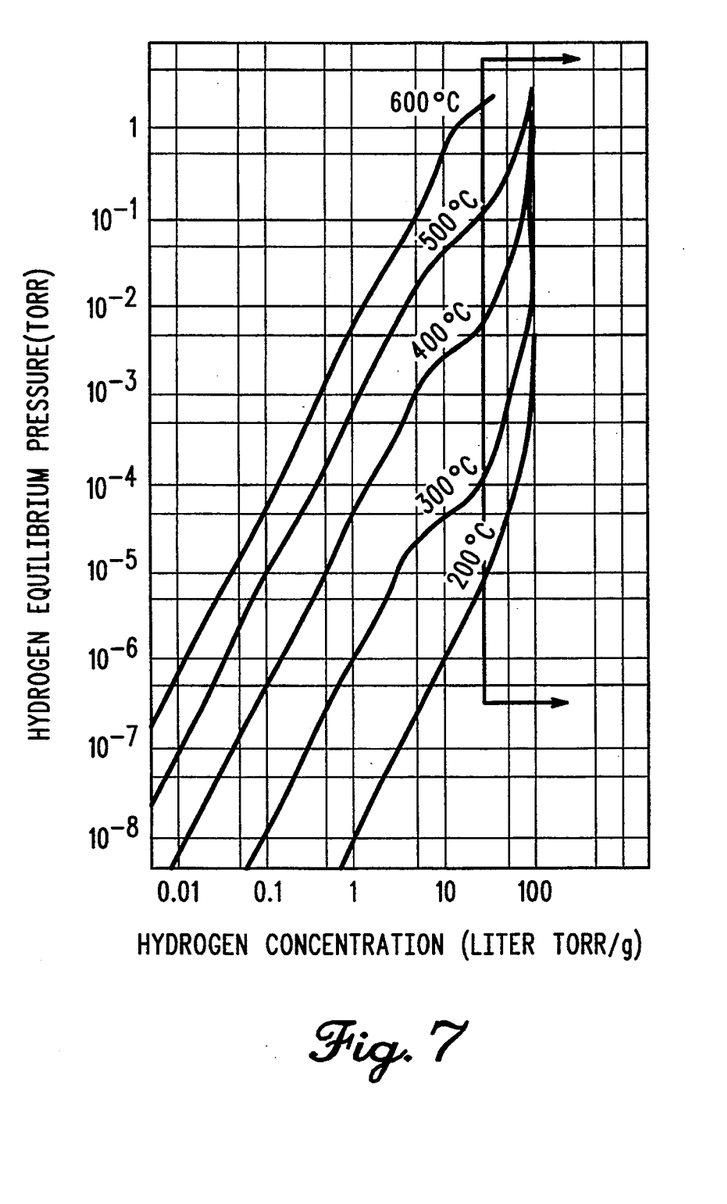
FIG. 7 illustrates hydrogen equilibrium pressures over a St 707 getter alloy for different temperatures.

FIG. 5A shows the cylindrical form of the battery 12 having loosely wrapped insulation layers 18 (See FIG. 5B). The amount of insulation layers needed between the getter 30 layer (see FIG. 5B) and outside jacket casing 31 would depend on the specific gettering alloy selected, and the temperature required for the low heat loss mode of operation. An alternative to locating the getter 30 (or other getter means) within the jacket 10 is to provide an external gettering unit 36 (in phantom in FIG. 5A) and to connect this unit 36 to all modules 40 with welded tubing 38. Such an approach would preferably use a getter that operates effectively at room temperature for removing oxygen, nitrogen, and hydrogen. A getter supplied by SAE Getters/U.S.A., Inc. (designated St 737), is such an example. For this application, approximately 5000 Pa-L (0.0045 g) of hydrogen must be released by the getter 30 for the modules 40 to provide a hydrogen pressure of 1000 Pa within the insulation at the average temperature. Each gram of getter alloy will store 2500 Pa-L of hydrogen without embrittlement. Thus, 20 to 50 g of getter material for each of the modules 40 would provide sufficient getter alloy for removing oxygen and nitrogen irreversibly and would provide for the storage of the required hydrogen.

In another aspect of the invention the bipolar battery 12 can be supported in the center of the loosely wrapped insulation layer 18 of the cylindrical modules 40 by wrapping the insulation layers 18 in widths of about 30 cm with overlapping of about 1 to 2 cm between simultaneously wrapped sections. The overlapped region would have twice the density of material (still less than tightly wrapped insulation) and assist in maintaining the position of the battery 12 without compression of the main body of insulation.

For such cylindrical bipolar battery jackets 10, the pressure variation technique for controlling cooling by means of getters has several advantageous features:

1) The gettering system normally provided :for maintaining the vacuum in the insulating jacket can be used for enhancing the rate of heat loss with little additional cost.

2) Elimination of the gas blower and piping associated with conventional air cooling of batteries would reduce costs.

3) No cooling gas tubing enters the high-temperature region and, thus, a path for heat loss is avoided.

4) Loosely wrapped layers of aluminum foil and glass-fiber paper weigh less and cost less than currently used insulating systems that support the inner and outer jacket casings.

5) For a cylindrical bipolar module, heat is uniformly removed from the cylindrical surface of the bipolar stack, which would limit temperature differentials and extend cell life.

6) The separation of the battery into several separate modules may improve the use of space in the vehicle and makes possible more even distribution of the battery weight.

7) Individual modules that fail can be replaced more easily and at less cost than replacing part of a battery within a single insulating jacket.

While preferred embodiments have been shown and described along with conventional calculations of performance of a cooling system for a high temperature battery, it will be understood that the full scope of the invention is defined by the claims set forth hereafter and their equivalents as understood by those of ordinary skill in the art.

What is claimed is:

1. A device for controlled insulation of a thermal source, comprising:

a thermal jacket having a closed volume capable of being evacuated to form an insulating jacket for control of temperature of the thermal source; and a getter material in communication with the closed volume of said thermal jacket, said getter material for absorbing and desorbing a control gas to control gas pressure in the volume of said thermal jacket, thereby enabling control of thermal conductivity of said thermal jacket and in turn the rate of heat loss from, and the temperature of, said thermal source.

2. The device as defined in claim 1 wherein said thermal jacket comprises a multi-layer insulating structure having a plurality of interconnected volumes forming the closed thermal jacket volume capable of being evacuated.

3. The device as defined in claim 1 wherein said thermal source comprises a high temperature battery assembly.

4. The device as defined in claim 3 wherein said control gas consists essentially of hydrogen.

5. The device as defined in claim 4 wherein said getter material comprises a Zr/V/Fe alloy.

6. The device as defined in claim 5 wherein said alloy consists essentially of V of about 20–30 weight percent, Fe of about 5–30% and Zr the balance.

7. The device as defined in claim 4 further including a heating element in thermal communication with said getter material and said getter material being heated by said heating element increases in temperature and desorbs the hydrogen gas in said jacket volume and said getter material absorbs the hydrogen gas in said jacket volume when said getter material decreases in temperature.

8. The device as defined in claim 1 further including means for controlling the temperature of said getter material thereby enabling control of absorption and desorption of said control gas to change gas pressure in said thermal jacket.

9. The device as defined in claim 1 wherein said getter material can remove a gas selected from the group consisting of nitrogen, oxygen and hydrogen.

10. The device as defined in claim 1 wherein said thermal source comprises batteries selected from the group consisting of lithium/sulfide and sodium/nickel chloride batteries.

11. The device as defined in claim 1 wherein said getter material further comprises means for absorbing gases for reducing pressure to thereby function as a vacuum pump for said cooling jacket.

12. The device as defined in claim 1 wherein said thermal source comprises at least one of a high temperature battery, a solid oxide fuel cell, and a high temperature fuel cell.

13. A method of controlling temperature of a thermal source, comprising the steps of:

(a) installing about said thermal source a thermal jacket having a closed thermal shield volume; and (b) coupling a getter material to said closed thermal shield volume, said getter material absorbing and desorbing a control gas upon decrease and increase, respectively, of the temperature of said getter material, and the changing of gas pressure in said closed thermal shield volume changing the thermal conductivity of said thermal jacket to control the temperature of said thermal source.

14. The method as defined in claim 13 wherein said thermal source comprises at least one of a high temperature battery, a solid oxide fuel cell, and a high temperature fuel cell.

15. The method as defined in claim 13 wherein said gas is selected from the group consisting of nitrogen, hydrogen and oxygen.

16. The method as defined in claim 13 wherein said getter material is coupled to means for heating the getter material to control the temperature of said getter material.

17. The method as defined in claim 13 wherein said getter material is disposed within said thermal jacket.

18. The method as defined in claim 13 wherein said getter material is disposed apart from said thermal jacket, but coupled to said thermal shield volume by tubing.

19. A method for enabling temperature control of a battery, comprising the steps of:

(a) coupling a thermal jacket to said battery, said thermal jacket having a closed thermal shield volume able to be evacuated; and (b) coupling a getter to said closed thermal shield volume, said getter able to absorb and desorb a control gas from said closed thermal shield volume upon causing a decrease and increase, respectively, of the temperature of said getter thereby causing a change of gas pressure in said closed thermal shield volume and consequent change of thermal conductivity of said thermal jacket to control the temperature of the battery.

20. The method as defined in claim 19 wherein said getter is at least one of disposed within said thermal jacket and disposed apart from, but coupled by tubing to, said thermal jacket.

* * * * *

UNITED STATES PATENT AND TRADEMARK OFFICE
CERTIFICATE OF CORRECTION

PATENT NO. : 5,347,816
DATED      : September 20, 1994
INVENTOR(S): Nelson, et al.

It is certified that error appears in the above-identified patent and that said Letters Patent is hereby corrected as shown below:

Column 3, Line 37,       cancel "SALES" and insert
                         --- SAES ---;

Column 7, Line 22,       cancel "robes" and insert
                         -- tubes --;

Column 10, Line 1,       after "material" insert a --
                         comma (,) --.

Signed and Sealed this

Twenty-ninth Day of November, 1994

Attest:

BRUCE LEHMAN

*Attesting Officer*        *Commissioner of Patents and Trademarks*